United States Patent
Simmons

(10) Patent No.: US 12,314,747 B2
(45) Date of Patent: May 27, 2025

(54) LENSES WITH PORTABLE BINARY CODE

(71) Applicant: SOURCE INC., Toronto (CA)

(72) Inventor: John-Alan Maxwell Simmons, Toronto (CA)

(73) Assignee: SOURCE INC., Toronto (CA)

(*) Notice: Subject to any disclaimer, the term of this patent is extended or adjusted under 35 U.S.C. 154(b) by 66 days.

(21) Appl. No.: 18/116,112

(22) Filed: Mar. 1, 2023

(65) Prior Publication Data

US 2023/0281010 A1 Sep. 7, 2023

Related U.S. Application Data

(60) Provisional application No. 63/315,400, filed on Mar. 1, 2022.

(51) Int. Cl.
| | |
|---|---|
| *G06F 9/455* | (2018.01) |
| *G06F 8/41* | (2018.01) |
| *G06F 8/51* | (2018.01) |
| *G06F 8/71* | (2018.01) |

(52) U.S. Cl.
CPC .............. *G06F 9/4552* (2013.01); *G06F 8/41* (2013.01); *G06F 8/51* (2013.01); *G06F 8/71* (2013.01)

(58) Field of Classification Search
CPC ..... G06F 8/40; G06F 8/41; G06F 8/51; G06F 8/52; G06F 8/71; G06F 8/76; G06F 9/4552
See application file for complete search history.

(56) References Cited

U.S. PATENT DOCUMENTS

| | | | |
|---|---|---|---|
| 8,484,231 B2* | 7/2013 | Li | G06F 16/176 707/756 |
| 11,301,243 B2 | 4/2022 | Mayer et al. | |
| 2011/0173168 A1* | 7/2011 | Jones | G06F 16/88 707/802 |
| 2013/0198462 A1* | 8/2013 | Serlet | G06F 12/0866 711/170 |

(Continued)

FOREIGN PATENT DOCUMENTS

| | | |
|---|---|---|
| WO | WO-0248856 A1 | 6/2002 |
| WO | WO-2019063995 A1 | 4/2019 |
| WO | WO-2021009625 A1 | 1/2021 |

OTHER PUBLICATIONS

Vogelsang, Lucas. "Introducing Precise-Proofs: Create & Validate Field-Level Merkle Proofs." Medium, Centrifuge, Apr. 24, 2018, Retrieved on Apr. 5, 2023 from the Wayback machine at URL: https://web.archive.org/web/20210619074742/https://medium.com/centrifuge/introducing-precise-proofs-create-validate-field-level-merkle-proofs-a31af9220df0.

(Continued)

*Primary Examiner* — Geoffrey R St Leger
(74) *Attorney, Agent, or Firm* — Perry + Currier

(57) ABSTRACT

An application includes a runtime environment that is operable on a portable binary-code format. The application references a lens file that defines a binary lens compiled to the portable binary-code format from an arbitrary programming language. The lens file further defines parameters passable to the binary lens as arguments. The binary lens is executable with the application on data of a first schema to transform the data to a second schema. The lens file may compose binary lenses defined in lens modules. Lens modules and lens files may be distributed through a repository.

12 Claims, 7 Drawing Sheets

(56) References Cited

U.S. PATENT DOCUMENTS

| | | | |
|---|---|---|---|
| 2013/0219030 A1* | 8/2013 | Szabo | H04L 49/70 |
| | | | 709/221 |
| 2019/0272179 A1* | 9/2019 | McMullen | G06F 9/445 |
| 2021/0067330 A1 | 3/2021 | Rasmussen | |
| 2021/0232639 A1* | 7/2021 | P | G06N 20/00 |
| 2021/0234671 A1 | 7/2021 | Solan et al. | |

OTHER PUBLICATIONS

Centrifuge, "The First Protocol to Bring Real-World Assets to Defi." date unknown, centrifuge.io/. Retrieved from the Internet on Apr. 5, 2023 from URL: https://centrifuge.io/.

Vitalik, "Verkle Trees." Vitalik Buterin's Website, Jun. 18, 2021, Retrieved from the Internet on Apr. 5, 2023 from URL: https: vitalik.ca/general/2021/06/18/verkle.html.

Matsuda, Kazutaka et al. "Applicative bidirectional programming with lenses." Proceedings of the 20th ACM SIGPLAN International Conference on Functional Programming. 2015.

Hackage, "App-Lens.", hackage.haskell.org, date unknown, Retrieved from the Internet on Apr. 5, 2023 from URL: https:// hackage.haskell.org/package/app-lens.

Litt, Geoffrey et al., "Project Cambria—Translate Your Data with Lenses", inkandswitch.com, Oct. 2020. Retrieved from the Internet on Apr. 5, 2023 from URL: https://www.inkandswitch.com/cambria/.

* cited by examiner

LENSES WITH PORTABLE BINARY CODE

CROSS-REFERENCE TO RELATED APPLICATIONS

This application claims the benefit of U.S. provisional patent application Ser. No. 63/315,400, filed Mar. 1, 2022, which is incorporated herein by reference.

BACKGROUND

Computer applications are widely used. Maintaining and updating applications is an important function of a software developer. A more widely used application or an application that receives many updates may become increasingly difficult to maintain. It may be difficult and time consuming to covert among different data formats used by different applications or application versions.

SUMMARY

According to an aspect if this disclosure, a non-transitory computer-readable medium includes instructions that, when executed by a processor, cause the processor to execute an application at a host. The application includes a runtime environment that is operable on a portable binary-code format. The instructions further cause the host to receive a lens file. The lens file defines a binary lens compiled to the portable binary-code format from an arbitrary programming language and parameters passable to the binary lens as arguments. The instructions are further to receive data of a first schema at the host and execute the binary lens with the application on the data of the first schema to transform the data to a second schema.

According to another aspect if this disclosure, a non-transitory computer-readable medium includes instructions that, when executed by a processor, cause the processor to compile a lens to a portable binary-code format from an arbitrary programming language and distribute the lens to an application at a host. The application includes a runtime environment that is operable on the portable binary-code format. The lens provides for data communication, synchronization, or both among different versions of the application operating at different hosts.

Each of the above aspects may be embodied as a non-transitory computer-readable medium, a computing device, a method, or other suitable embodiment.

DETAILED DESCRIPTION

Computer applications may operate on and share data using different schemas. Schemas may have different versions. A schema may change when, for example, an application is updated or when a new application is created.

Schemas of different applications and versions or sources thereof, whether of a centralized or decentralized environment, can have different formats and structures. Examples of decentralized environments include edge environments, such as internet-of-things (IoT) devices, smartphones, tablets, desktop/laptop computers, and web browsers; near-edge environments, such as a Cloud Content Delivery Network (CDN); and more traditional storage and compute networks. Different formats and structures of schemes can lead to difficulties in ensuring interoperability as schemas quickly diverge from each other.

This problem is seen, for example, in database migration, where application version evolution and platform interaction with two systems may become completely independent from one another with little option for reconciliation without data loss on one or both sides.

This disclosure concerns techniques for portable data migration and transformation, particularly, in a decentralized manner. The techniques allow different application versions with different schemas (each with different versions) to communicate and synchronize data without complying to a particular schema or version thereof. This frees developers, who may operate in a decentralized peer-to-peer local-first approach for application development, from requiring their clients to abide by a particular schema or version thereof.

The techniques discussed herein include bidirectional lenses written in a portable binary-code format, such as WebAssembly, to provide portability to transform data from one shape to another. A modular framework is taught, in which an application binary interface (ABI) is used for interactions between a host environment and a binary module that defines a lens. A lens is compiled to the portable binary-code format from an arbitrary origin language, which allows existing origin language-specific software development kits (SDKs) to assist in the development of ABI-compliant modules.

The techniques discussed herein provide a consistent system which allows developers to easily transform data from one structure to another without mass coordination. Systems implementing these techniques can operate in both centralized and decentralized environments and readily employ a standards-first approach.

Figure 1:
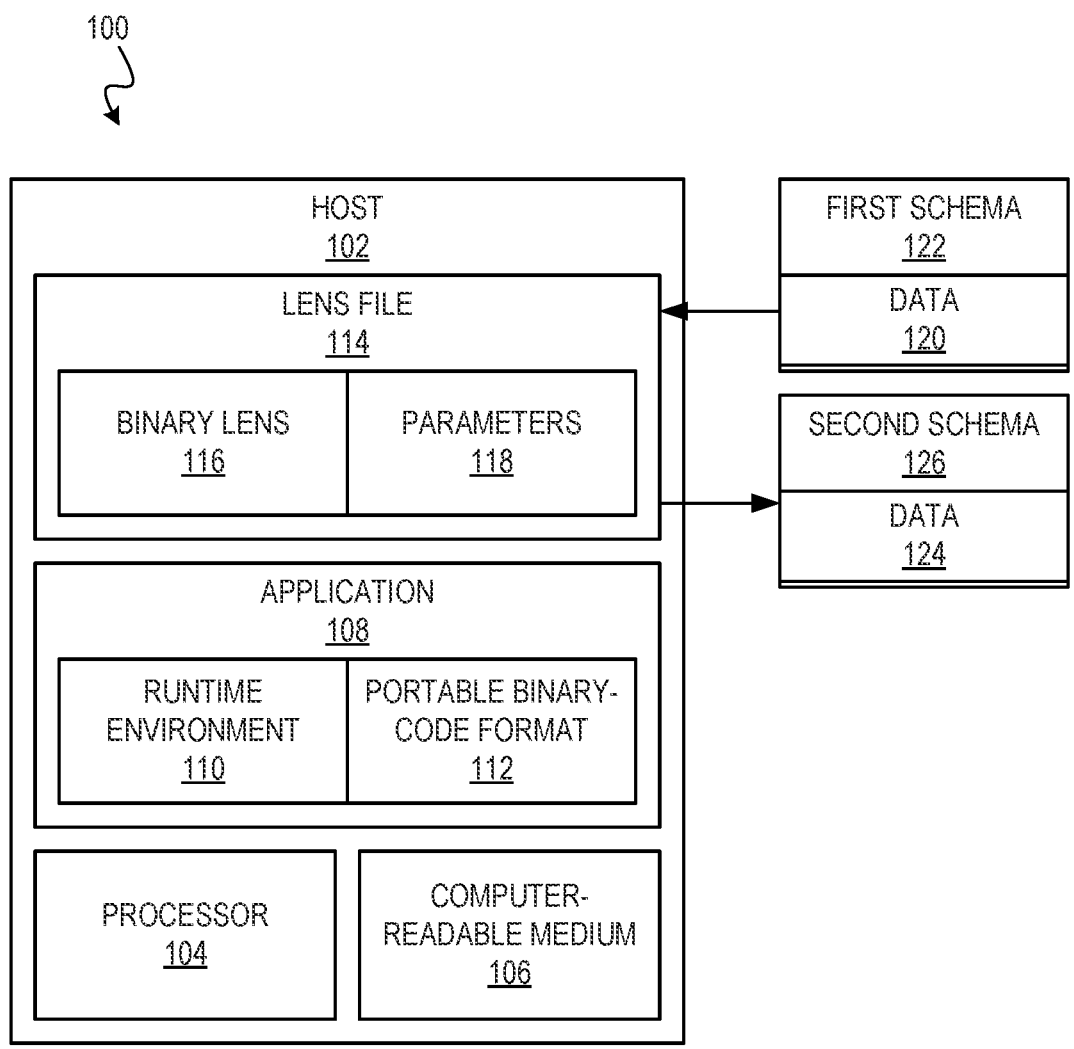
FIG. 1 is a block diagram of an example system for portable data migration and transformation using bidirectional lenses.

FIG. 1 shows an example system 100 for portable data migration and transformation using bidirectional lenses.

The system 100 includes a host 102, which may be a computing device such as a server, desktop computer, notebook/laptop computer, tablet computer, smartphone, or similar device. The host 102 includes a processor 104 and non-transitory computer-readable medium 106. The host 102 may further include other components, such as a network interface, display device, user-input device (e.g., keyboard, mouse, touchscreen, touchpad, etc.), and so on.

The processor 104 may include a central processing unit (CPU), a microcontroller, a microprocessor, a processing core, a field-programmable gate array (FPGA), an application-specific integrated circuit (ASIC), or a similar device capable of executing instructions.

The non-transitory machine-readable medium 106 cooperates with the processor 104. The medium 106 may include an electronic, magnetic, optical, or other physical storage device that encodes the instructions. The medium 106 may include volatile memory, non-volatile storage, or a combination of such. For example, the medium 106 may include random-access memory (RAM), read-only memory (ROM), electrically-erasable programmable read-only memory (EEPROM), flash memory, a storage drive, an optical drive, or similar device.

The non-transitory machine-readable medium 106 stores instructions that are executable by the processor 104 to implement the functionality discussed herein. The instructions may be directly executed, such as a binary file, and/or may include interpretable code, bytecode, source code, or similar instructions that may undergo additional processing to be executed. Functionality attributed to the host 102 is performed by the processor 104 and medium 106 cooperating to execute instructions.

The host 102 executes an application 108, which may include the host 102 executing an operating system to facilitate executing of the application 108.

The application 108 includes a runtime environment 110 that is operable on a portable binary-code format 112. The application 108 may have any purpose, such as productivity (word processing, spreadsheet, etc.), chat/messaging, data/file/image/video storage, entertainment, etc. just to name a few examples.

The runtime environment 110 may be implemented with a programming language such as Go, JavaScript, Node, and Rust. The portable binary-code format 112 may be WebAssembly (sometimes called WASM). The runtime environment 110 may support an application binary interface (ABI), such as the WebAssembly System Interface or WASI.

The host 102 includes a lens file 114. The lens file 114 defines a binary lens 116 that is compiled to the portable binary-code format 112 (e.g., WebAssembly) from an arbitrary origin programming language. That is, the binary lens 116 may be written in a programming language, such as Go, AssemblyScript, Rust, C++, or other supported origin language, and then compiled to the portable binary-code format 112 (e.g., WebAssembly). The binary lens 116 may be compiled according to the supported ABI (e.g., WASI), which defines functions required to be implemented by the binary lens 116 and functions required to be implemented by the application 108. The result of such compilation may be binary code, which is sometimes referred to as bytecode in the context of WebAssembly. The binary lens 116 may be bidirectional.

A lens or lens function is a technique that comes from functional programming. A lens creates a view of the structure of an object and a method of modifying that structure. This is achieved by treating the structure and state of the application as a "black box" and using protected functions (e.g., get and set functions) to get a value from the application structure or to set a value to a respective function inside the black box. A lens function is not tied to the internal workings of the application and is independent of the structure and the state of the object. A lens may provide an interface between an external schema, understood outside the application, and an internal schema, understood within the application.

A bidirectional lens follows the same principles and allows the get and set functions to operate both ways. A bidirectional lens function has a tertiary argument which denotes the direction towards which the function operates.

A bidirectional lens is a succinct transformation that can be applied in a forward and reverse direction to modify objects field-by-field from one schema to another. This includes renaming fields, moving fields from sub-objects, mapping fields from one type to another (e.g., scalar to an array), and similar.

A lens operates in an isolated layer, with minimal additional metadata to reduce complexity and dependency on other elements of the software stack. Each lens executes a single transformation, which can then be composed into more complex lenses, or into an array of lenses to be executed.

A binary lens 116 may be written in any supported original programming language, compiled to the portable binary-code format 112 (e.g., WebAssembly), and then used in the context of the same or different programming language of the runtime environment 110. This promotes a decentralized and open environment for the creation of lenses 116. For example, if a particular lens to achieve a particular operation, functionality, or schema migration does not currently exist, a developer can write a new lens function in his/her programming language of choice and publish a lens file 114 (or module, as discussed below) for use by other developers irrespective of their programming language(s) of choice. This provides greater interoperability in a decentralized environment.

The binary lens 116 may be operable to rename a field of data, move a field of data among a hierarchy of fields, map a field of the data from a first type to a second type, or perform another simple and discrete transformation.

The lens file 114 further defines parameters 118 passable to the binary lens 116 as arguments.

In operation, the host 102 may receive first data 120 of a first schema 122 and execute the binary lens 116 with the application 108 on the first data 120 to transform it into second data 124 of a second schema 126. The first and second schemas 122, 126 are different. First data 120 and second data 124 may be the same data.

The binary lens 116 may be bidirectional. Accordingly, the host 102 may, additionally or alternatively, receive second data 124 of the second schema 126 and execute the binary lens 116 with the application 108 on the second data 124 to transform it into first data 120 of the first schema 122.

The first and second schemas 122, 126 may each be defined by a set of attribute-value pairs in human-readable text. For example, the first and second schemas 122, 126 may be defined using a data-interchange format, such as JavaScript Object Notation (JSON), and may define fields to store data in a structured manner.

The first and second schemas 122, 126 are different and may exist due to the application 108 having different versions installed at different hosts 102, which may be a result of differing capabilities of hosts 102, updates to the application 108 that are not adopted by all hosts 102, or similar circumstances. The application 108 at a host 102 may be of a version that supports the second schema 126, while a version of the application 108 at another host 102 may support the first schema 122. The lens file 114 thus allows such versions of the application 108 to communicate and/or synchronize data despite the different schemas 122, 126.

The first and second schemas 122, 126 are examples and any number and configuration of schemas may be supported.

Figure 2:
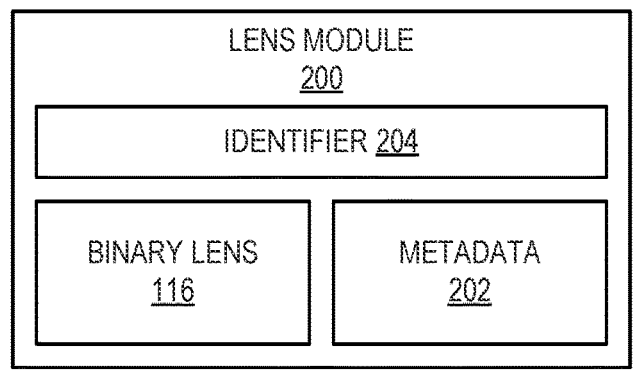
FIG. 2 is a block diagram of an example lens module.

FIG. 2 shows an example lens module 200, which may be used with the system 100 as well as with other systems and methods. For example, the lens module 200 may be provided by the lens file 114 of the system 100.

The lens module 200 includes a compiled binary lens 116, associated metadata 202, and a unique identifier 204. The unique identifier 204 may be termed a content identifier (CID). The lens module 200 may be a single CID-based object. The lens module 200 may conform to a content identified data model, such as InterPlanetary Linked Data (IPLD). This allows developers to pinpoint the specific instance or version of a lens and form a dependency that cannot be broken by future updates.

The unique identifier or CID 204 may conform to a content addressable storage methodology. For example, a unique identifier 204 may be generated by taking a cryptographic hash (e.g., SHA-256) of a lens module 200. The hash of the lens module 200 may be generated, for example, when the lens module 200 is published. The author may generate the hash. The unique identifier 204 may thus be used as an address to obtain the lens module 200, as an indicator of the content of the lens module 200, and as a confirmation of the integrity of the lens module 200. Using a content addressable storage methodology for unique identifiers 204 also facilitates distributed/decentralized creation of lens modules 200, in that unique identifiers 204 need not be generated and managed by a central authority. Using a content addressable storage methodology means that, if two unique identifiers 204 are identical, then the two respective lens modules 200 are identical.

The lens module 200 may be expressed in a structured format, such as JSON or YAML.

The binary lens 116 may define a single, discrete transformation (e.g., rename, replace, etc.) and may be compiled to a portable binary-code format 112 (e.g., WebAssembly, see above) with reference to an ABI such as WASI.

The metadata 202 may define, for the binary lens 116, the functional goal, parameter types, and dependencies on other lenses.

The metadata 202 may define a structure for input to the binary lens 116 and another structure for output from the binary lens 116. The metadata 202 may be expressed as a JSON schema which provides syntactic restrictions such as identifying the binary lens 116 as an object and the required fields for the binary lens 116.

The metadata 202 may define dependencies in the case that the binary lens 116 depends on one or more other binary lenses 116. The lens module 200 may thus define a hierarchical flow of input, output, and dependencies.

Figure 3:
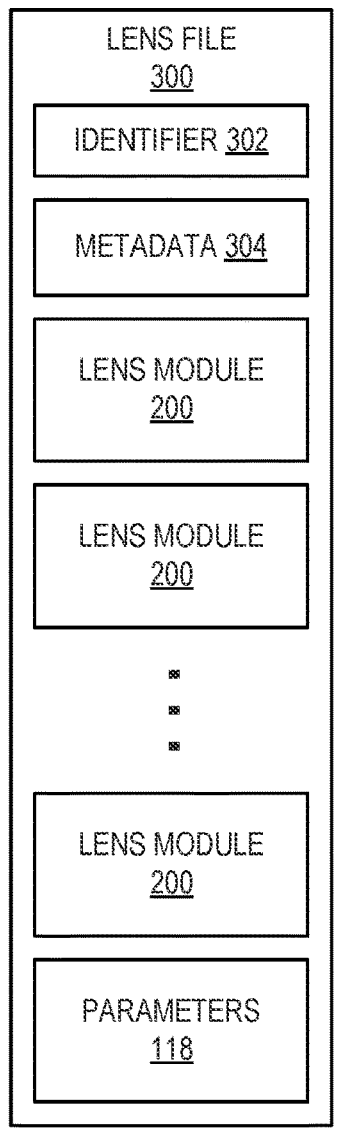
FIG. 3 is a block diagram of an example lens file.

FIG. 3 shows an example lens file 300, which may be used with the system 100 as well as with other systems and methods. For example, the lens file 300 may be provided as the lens file 114 of the system 100. The lens file 300 may be uniquely identified by an identifier 302, such as a CID. The above discussion concerning identifiers 202 applies to identifiers 302.

The lens file 300 defines a lens composed of a plurality of lens modules 200 (see above) and defines parameters 118 passable to the lens as arguments. The lens file 300 may be expressed in a structured format, such as JSON or YAML. The lens file 300 may define a composed transformation to, for example, convert an entire document from one schema to another schema. That is, the lens file 300 may compose discrete, field-level transformations provided by lens modules 200 into a composed, document-level transformation.

The lens file 300 may reference the lens modules 200 by the respective identifiers 204. That is the lens file 300 may include a literal list or array of identifiers 204.

In this example, the lens file 300 defines first, second, and third lens modules 200 that each define the binary lens 116 (see above) that may each be compiled to the portable binary-code format 112 (see above) from a respective arbitrary programming language. The binary lens 116 of each lens module 200 may be compiled from any supported arbitrary programming language, which may be different for each lens 116. The lens file 300 may define any number and configuration of lens modules 200.

The lens file 300 may define the order of execution of the lens modules 200. The lens modules 200 may be listed in the lens file 300 in the desired execution order. Alternatively, the lens modules 200 may be accompanied by an express indication of order, such as a number or reference. The parameters 118 passable to the lens as arguments should match the arguments defined in the lens modules 200.

The lens file 300 may further include metadata 304, which may identify the schemas that the lens file 300 is intended to operate on. The metadata 304 may uniquely identify source and destination schemas by application name, schema name, version number, or similar. Alternatively or additionally, schemas may be assigned a unique identifier, and the metadata 304 may indicate the two schemas by way of their respective a unique identifiers.

Figure 4:
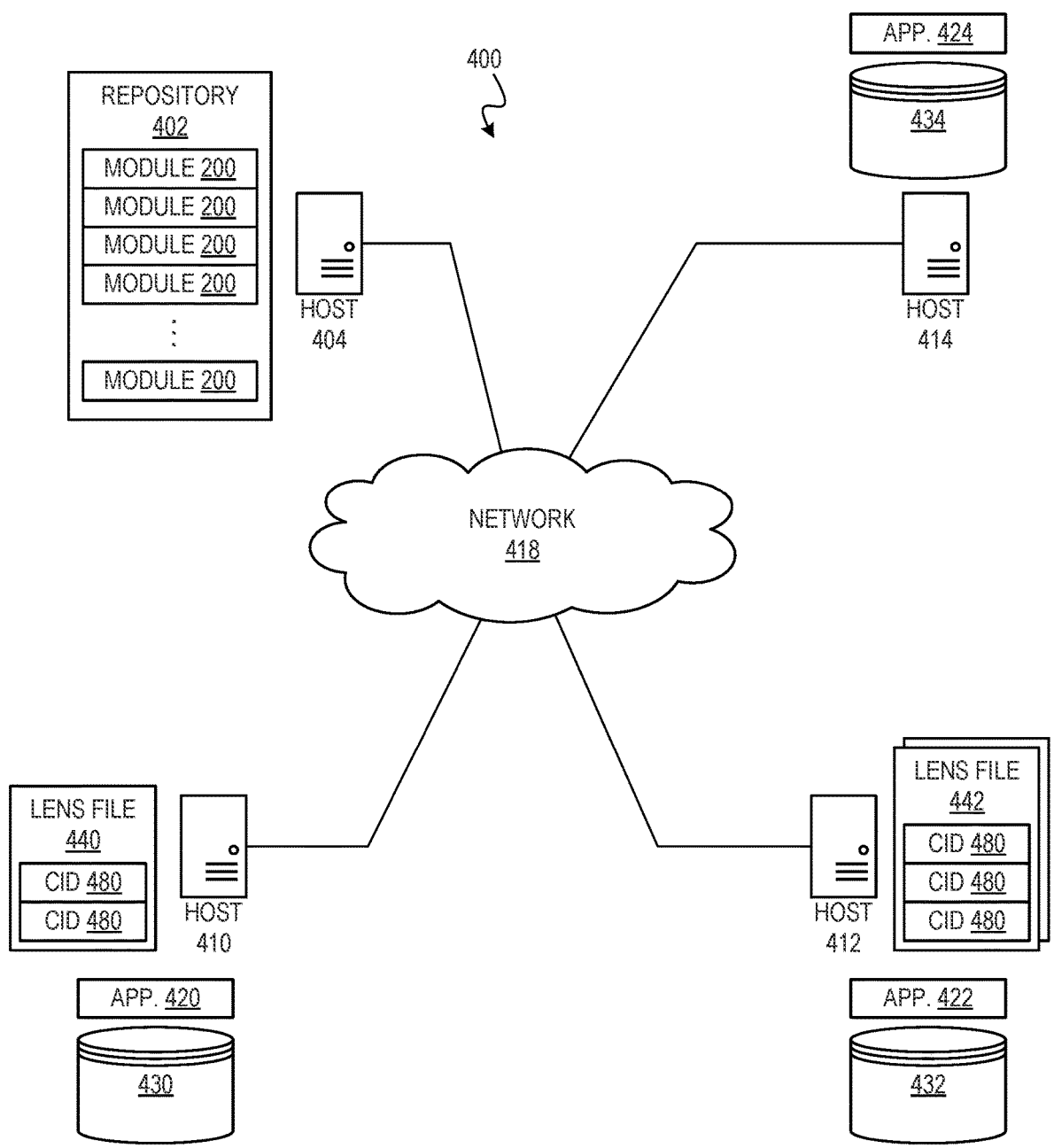
FIG. 4 is a block diagram of an example system with a lens repository.

FIG. 4 shows an example system 400 with a lens repository 402.

The lens repository 402 may be provided at a host computing device 404, such as a server. Any number of lens module repositories 402 on respective host computing devices 404 may be provided.

A lens repository 402 may store a collection of lens modules 200, each of which may include a binary lens compiled to the portable binary-code format 112 (see above) from a respective arbitrary programming language. Each lens module 200 may be uniquely identified by a CID or similar content addressable storage identifier.

The system 400 further includes various host computing devices 410, 412, 414 that may communicate with each other and with the repository 402 via a computer network 418, such as the internet.

The host computing devices 410, 412, 414 may execute different versions of an application 420, 422, 424 that reference respective data 430, 432, 434. The applications 420, 422, 424 may be of different versions and may thus store respective data 430, 432, 434 according to different schemas.

A host computing device 410 may include a lens defined by a lens file 440. The lens file 440 may import various lens modules 200 from the collection maintained at the repository 402 by reference to a CID 480 of each module 200.

Another host computing device 412 may include a lens defined by a lens file 442 that may also import various lens modules 200 from the repository 402 by reference to a CID 480 of each module 200.

A host computing device 410, 412, 414 may include any number of lens files 440, 442 to provide any configuration of bidirectional views of the data 430, 432, 434, which may accord to different schemas, to thereby allow the applications 420, 422, 424 to communicate and/or synchronize their data without needing the applications 420, 422, 424 or data 430, 432, 434 to be updated to comply with a current or accepted schema.

The lens repository 402 provides a readily adoptable way for a large number of lens files 440, 442 to be configured and managed in a decentralized manner.

The lens repository 402 may also store lens files 440, 442, so that any application in need of a lens file 440, 442 may download or otherwise use the lens file 440, 442. Each lens file 440, 442 may be stored with reference to the schemas that it operates on. Each lens file 440, 442 may be uniquely identified by a CID or similar content addressable storage identifier.

Figure 5:
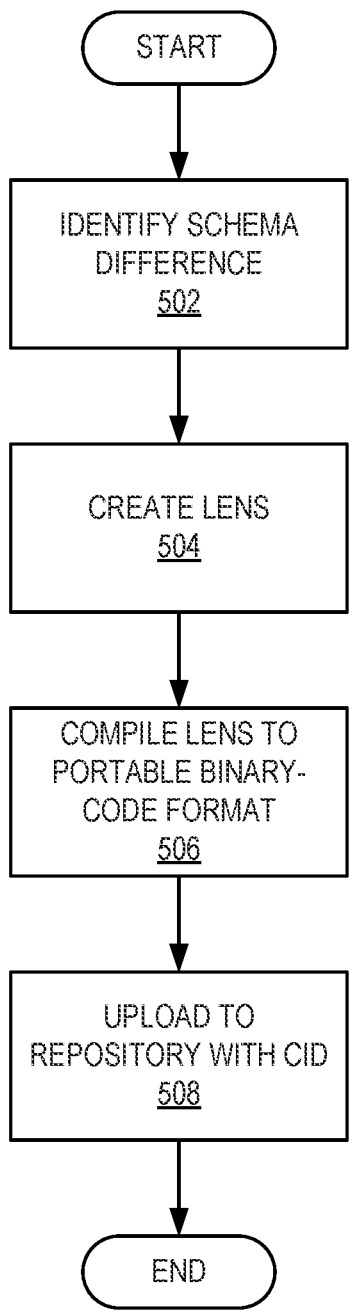
FIG. 5 is a flowchart of an example method for creating and distributing a lens.

FIG. 5 shows an example method 500 for creating and distributing a lens. The method 500 may be implemented by processor-executable instructions.

At block 502, a difference between first and second schemas is identified. This may be performed as part of an application update process. For example, when an application is updated to store new data, change a data format or type, add a function, remove a function, etc., a schema of the data referenced by the application may change. This change from old to new schema may be identified.

At block 504, a lens to convert data for the identified schema change is created. The lens may be bidirectional to allow conversion to and from the new schema. The lens may be created by identifying the fields, data types, mappings, structures, or other data elements that have changed and providing a sequence of discrete lens functions to effect the differences. The lens may be created in a programming language that the author of the lens prefers and may be created using an SDK that can assist the developer in writing efficient and error-free code.

At block 506, each lens function is compiled to a portable binary-code format (e.g., WebAssembly, see above) with reference to an ABI (e.g., WASI). The SDK may include or reference a suitable compiler. Supporting metadata and/or parameters may be generated.

A language-specific SDK may be used to create lens functions to ensure consistency and utility between languages. An SDK may provide hooks to import lenses from other languages via as a lens module. The SDK may provide consistent utility functions to manage incoming data and parameters and translate such to a lens file.

A lens function may be stored as a lens module. A lens module may be composed alone or with other module(s), into a lens file.

Then, at block 508, the compiled lens and supporting metadata and/or parameters may be uploaded as a lens module or lens file to a lens repository. The lens module or file may be assigned a CID for future reference. Metadata may describe the lens's functionality and any dependencies. A lens module may be offered by the repository to developers wishing to create lenses. A lens file may be offered by the repository to versions of the application that may be determined to require the lens.

Figure 6:
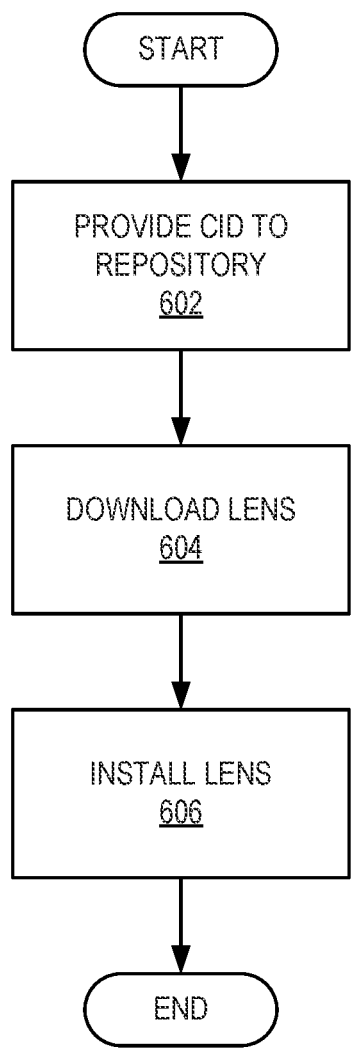
FIG. 6 is a flowchart of an example method for obtaining a lens.

FIG. 6 shows an example method 600 for obtaining and operating a lens. The method 600 may be implemented by processor-executable instructions.

At block 602, a need for a lens is identified. An application may be provided with a CID of a lens (and network address of a lens repository) in order to communicate with another version of the application. A developer may wish to update an application in development and may realize that a lens is needed. The CID may be provided to the lens repository.

At block 604, the lens identified by the CID is downloaded by the application or developer. The lens may be a lens module or a lens file that defines a composition of lens modules.

Then, at block 606, the lens is installed. An application may automatically install the lens. The developer may import the lens into the application under development using an SDK. The application or SDK may provide the context of a programming language that is different from the origin programming language of the lens.

Figure 7:
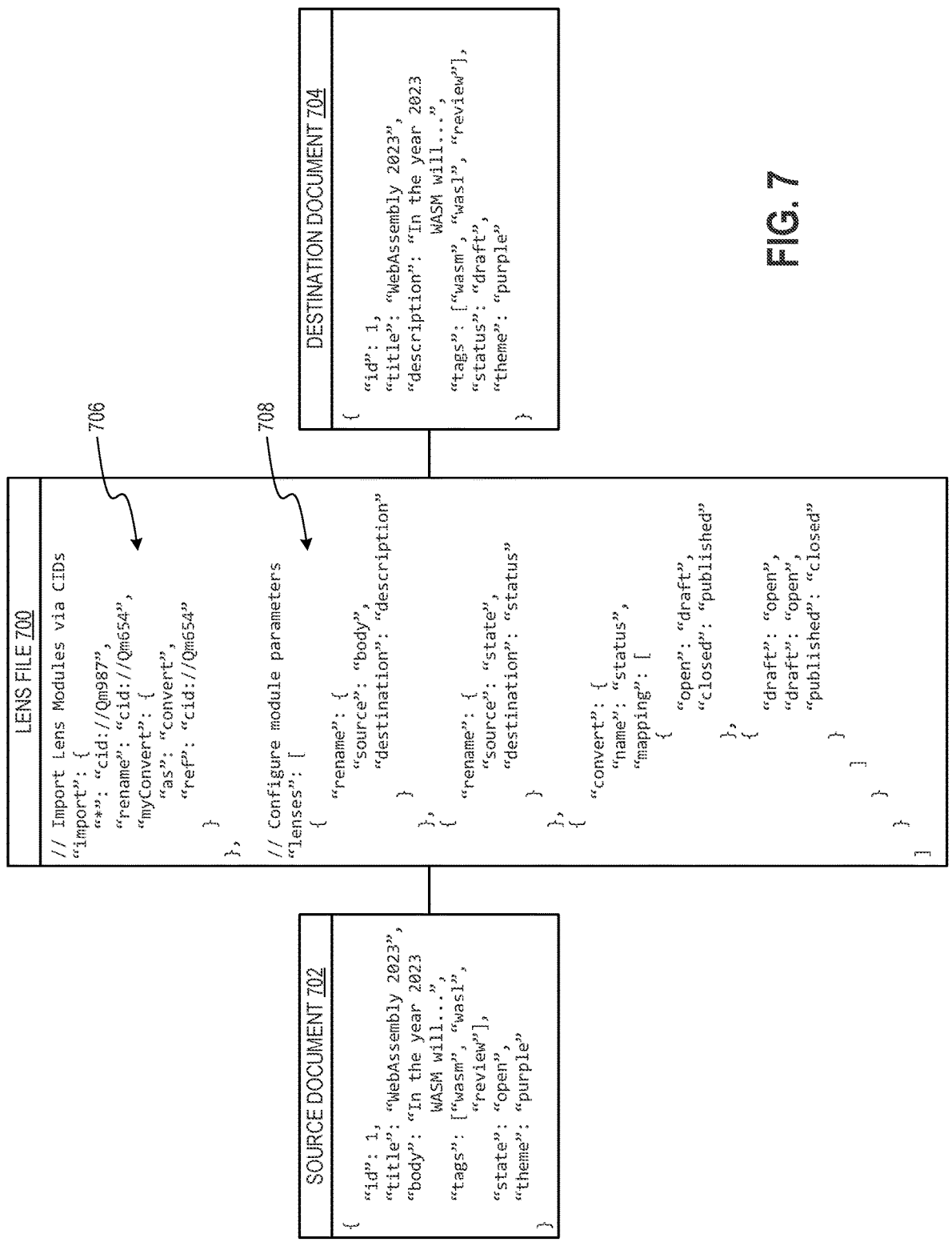
FIG. 7 is a diagram of an example bidirectional lens file.

FIG. 7 is a diagram of an example bidirectional lens file 700 usable to process a source document 702 into destination document 704, or vice versa.

As can be seen, the documents 702, 704 have different schemas for data contained therein. For example, the source document 702 references a "state" and the destination document 704 references a "status." State and status are not merely different names for the same field. Rather, there may be different underlying logic as to what is a state or status, how it is changed, and to what value a state or status may be changed.

The lens file 700 includes a first portion 706 that imports lens modules that contain binary lenses that accord with a portable binary-code format, such as WebAssembly, as discussed elsewhere herein. A lens module may be uniquely referenced by its content identifier or "cid." Note that identifiers used in the figure (e.g., "Qm654") are truncated for sake of brevity. It is intended that the identifiers conform to a content addressable storage methodology, as discussed above.

The lens file 700 includes a second portion 708 that configures parameters for each module that is imported, so that a given binary lens is linked to respective values from the documents 702, 704.

For example, in the first portion 706 of the lens file 700, a lens function "myConvert" is imported from a module with a content identifier of "Qm654" and is defined as "convert" in the namespace of the lens file 700. Then, in the second portion 708 of the lens file 700, the lens function "convert" is provided with parameters that reference the particular schemas involved, that is, the schemas of the documents 702, 704. The destination field "status" and the source field "state" are provided with a mapping between status and state identifiers. The lens file 700 thus enables the generalized binary lens function "myConvert" to operate on the specific schemas of the documents 702, 704. The lens file 700 is thus a single, governing object of conversion between the documents 702, 704.

It is worth noting that the language in which the lens function "myConvert" was written and the language that executes the lens file 700 may be different, which is one of the advantages of the techniques discussed herein. In this example, the lens function "myConvert" was previously compiled to WebAssembly.

Figure 8:
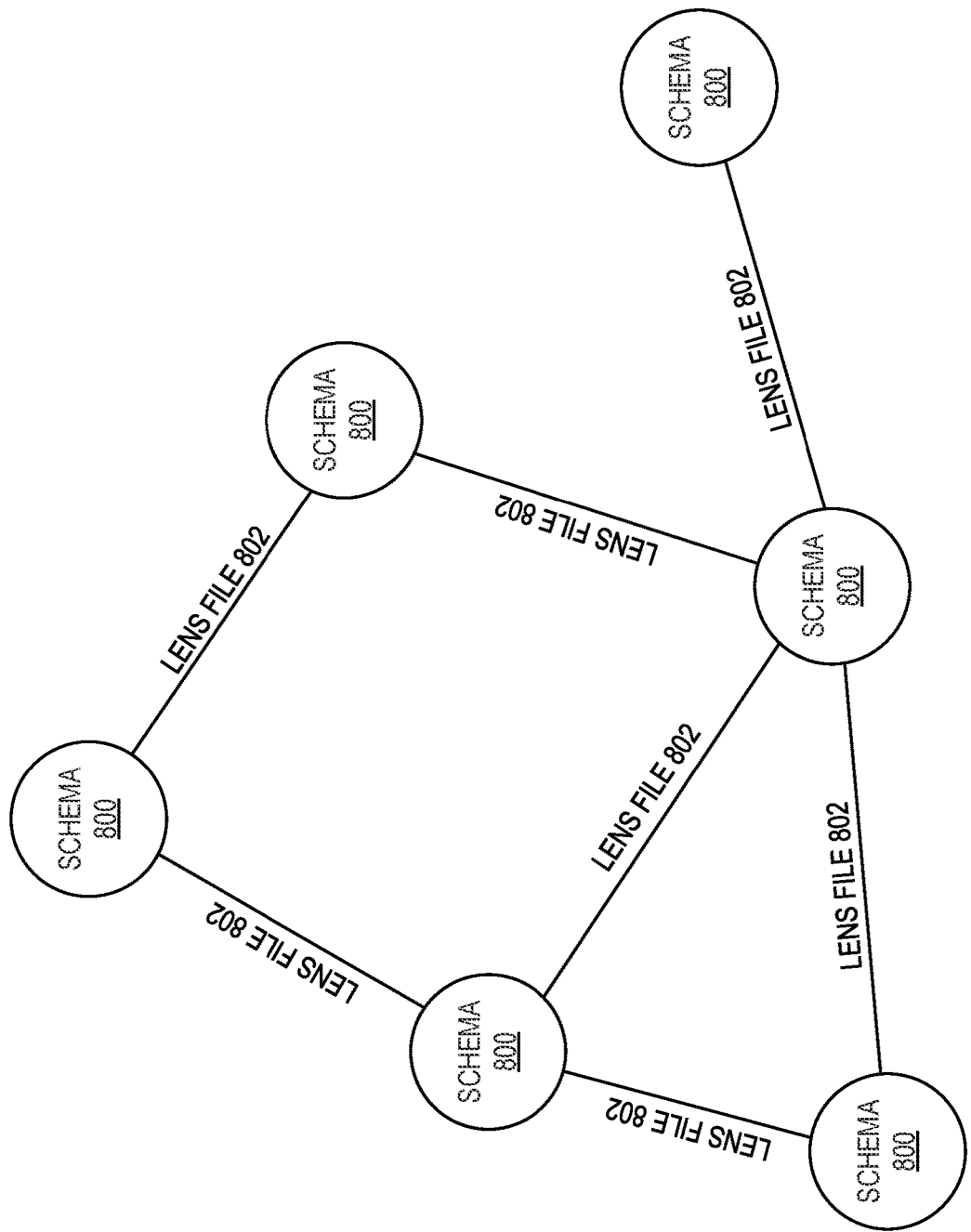
FIG. 8 is a diagram of a schema and lens-file graph.

With reference to FIG. 8, a graph of a relationship among different schemas 800 and lens files 802 may be generated, maintained, and queried to provide useful information. Schemas 800 may be considered nodes and lens files 802 may be considered edges. A lens file 802 may identify the connected source and destination schemas 800 in metadata (see FIG. 3 above). Such metadata may be used to generate and maintain a graph, such as the one depicted.

Schemas 800 and lens files 802 may be registered, for example, at a computing device, such as the repository discussed above with regard to FIG. 4. Schemas 800 and lens files 802 may be stored using content addressable storage identifiers, discussed above.

The graph may be walked to identify one or more lens files 802 usable to conduct a particular translation among two particular schemas 800. There may be more than one path between schemas 800 and thus more than one combination of lens files 802 capable of translation. A path with a fewer number of lens files 802 may be selected over other possible paths. In other examples, other metrics, such as speed, file size, etc., may be used to select among multiple paths between the same pair of schemas 800.

A computing device may be configured to take as input an identifier of a source schema 800 and an identifier of a destination schema 800, walk the graph accordingly, and respond to the input with output containing or identifying one or more lens files 802 capable of translating between the source and destination schemas 800.

In view of the above, it should be apparent that lenses may be compiled to a portable binary-code format and distributed to various hosts, so that different versions of an application that operate on different data schemas may communicate and/or synchronize data. This may enhance deployment of applications and reduce the effort and complexity in maintaining different versions applications.

Use of the portable binary-code format for compiled lenses is particularly advantageous. With a conventional approach, migrations are almost exclusively created and evaluated using a single language, against a single centrally controlled database. Because of this linear and traditional flow, the consistency of data can be readily guaranteed. There is very little cross-language, environment, or client version coordination required. This is starkly different from a decentralized, local-first environment. In this setting, different languages and implementations are the default, not the exception. For this reason, cross-language design, schema, and data migration must account for the differences and semantics of each language. This results in different flows of execution, type representation, memory models, etc.

As a result, these differences in client languages will create small divergences in consistency, which will quickly grow and become much worse over time.

One of the key goals for local-first software is the ability to keep everything consistent, and, more importantly, deterministic.

Determinism is one of the most important design goals as it means that clients are able to process locally, knowing their state will be consistent with respect to the rest of their peers and collaborators. Without a single consistent representation for lens modules, such as discussed herein, each of the various lens functions would have to be implemented numerous times, for each language and runtime, drastically increasing the surface for bugs or exploits, and more importantly allowing the language-specific semantics and idiosyncrasies to leak through the abstraction and violate the required determinism. This would result in situations in which the same expected lens transformations, executing locally on different clients, produce different results.

As discussed herein, a single bytecode representation for all lens functions, beyond having single implementations that follow the write-once-use-everywhere, guarantees determinism. The portable binary-code format (e.g., WebAssembly) discussed herein has been found to excel at determinism due to its simple execution and linear memory model, allowing all host runtimes to function identically despite their own underlying language differences.

It should be recognized that features and aspects of the various examples provided above can be combined into further examples that also fall within the scope of the present disclosure. In addition, the figures are not to scale and may have size and shape exaggerated for illustrative purposes.

I claim:

1. A non-transitory computer-readable medium comprising instructions that, when executed by a processor, cause the processor to:
   execute an application at a host, the application including a runtime environment that is operable on a portable binary-code format;
   receive a lens file at the host, wherein the lens file defines:
   a binary lens compiled to the portable binary-code format from an arbitrary programming language; and
   parameters passable to the binary lens as arguments;
   receive data of a first schema at the host; and
   execute the binary lens with the application on the data of the first schema to transform the data to a second schema.

2. The non-transitory computer-readable medium of claim 1, wherein the lens file defines a first lens module that defines the binary lens and a second lens module that defines a second binary lens that is compiled to the portable binary-code format from a respective arbitrary programming language.

3. The non-transitory computer-readable medium of claim 2, wherein the first and second lens modules are members of a collection of lens modules, wherein each lens module of the collection of lens modules is identifiable by a unique identifier.

4. The non-transitory computer-readable medium of claim 1, wherein the binary lens is compiled according to an application binary interface that defines functions required to be implemented by the binary lens and functions required to be implemented by the application.

5. The non-transitory computer-readable medium of claim 1, wherein the binary lens is operable to rename a field of the data, move a field of the data among a hierarchy of fields, or map a field of the data from a first type to a second type.

6. The non-transitory computer-readable medium of claim 1, wherein the first schema and the second schema are each defined by a set of attribute-value pairs in human-readable text.

7. The non-transitory computer-readable medium of claim 1, wherein the binary lens is a bidirectional lens.

8. A non-transitory computer-readable medium comprising instructions that, when executed by a processor, cause the processor to:
   compile a lens to a portable binary-code format from an arbitrary programming language; and
   distribute the lens to an application at a host, the application including a runtime environment that is operable on the portable binary-code format;
   wherein the lens provides for data communication, synchronization, or both among different versions of the application operating at different hosts.

9. The non-transitory computer-readable medium of claim 8, wherein the runtime environment provides a context of a programming language different to the arbitrary programming language to which the lens is compiled.

10. The non-transitory computer-readable medium of claim 8, wherein the lens is compiled according to an application binary interface that defines functions required to be implemented by the lens and functions required to be implemented by the application.

11. The non-transitory computer-readable medium of claim 8, wherein the lens is a bidirectional lens.

12. The non-transitory computer-readable medium of claim 8, wherein the instructions are further to generate a unique identifier for the lens using a content addressable storage methodology.

* * * * *